Patented May 28, 1940

2,202,363

UNITED STATES PATENT OFFICE 2,202,363

PLASTICIZED SYNTHETIC RUBBER COMPOSITIONS

Peter J. Wiezevich, now by judicial change of name Peter J. Gaylor, Elizabeth, N. J., assignor to Standard Oil Development Company, a corporation of Delaware No Drawing. Application December 18, 1936, Serial No. 116,482

7 Claims. (Cl. 260—4)

This invention relates to improved plasticized synthetic rubber compositions and methods of preparing same.

In the compounding of synthetic rubber it is common practice to incorporate with the rubber a small amount of a plasticizer or softener to increase the pliability, durability and tack of the rubber composition as well as to facilitate the compounding both by aiding the dispersion of solids and by lubricating the mix, whereby less power is consumed in the mixing. Many types of softeners have been used in the prior art such as vegetable, animal, and mineral oils, greases, asphaltic fluxes, fatty acids, rosin, cumar resins, tars, pitches and waxes.

The present invention involves primarily the preparation of a new and improved type of softener as will be described more fully hereinafter.

The synthetic rubber stock which may be plasticized with this new softening agent may comprise any of the rubber substitutes with or without subsequent curing, such as polyethylene sulfide, polymerized vinyl chloride or acetate or synthetic rubbers prepared by polymerization of synthetic diolefins such as butadiene, isoprene, or chloroprene, etc. In commercial practice a certain amount of reclaim rubber is often mixed with the fresh crude rubber and other ingredients are frequently added such as fillers, reinforcers, vulcanizing agents, accelerators, antioxidants, etc., in addition to the softeners as already mentioned.

According to the present invention a novel type of softener is prepared which preferably is a more or less plastic and elastic aliphatic hydrocarbon compound having a high molecular weight such as between the approximate limits of 800 to 5,000 or 10,000 or even 15,000, 100,000, 200,000 or more, which is substantially greater than that of paraffin wax generally considered to be between about 250 and 400. These compounds preferably have a linear chemical structure which may be represented by an almost completely saturated extremely long chain of carbon atoms with alkyl groups such as methyl, etc., attached as side chains onto either all of the carbon atoms in the chain or else just one or certain ones such as every second or third carbon atom. Polymers of this general structure may be advantageously prepared by polymerizing iso-olefines (isobutylene, isoamylene, etc.), at low temperature in the presence of a volatilizable inorganic halide as catalyst. The temperature may be between the approximate limits of 5° C. and —10 or —20° C. or even lower, depending upon the particular catalyst used. As catalyst, boron fluoride has been found particularly satisfactory. Also, boron fluoride mixed with hydrogen fluoride may be used as well as phosphorus trifluoride or pentafluoride and even aluminum chloride, preferably statu nascendi as obtained when aluminum is acted on by hydrogen chloride. In the case of aluminum chloride, 3 to 5% of the catalyst may be used whereas in the case of the previously mentioned catalyst, 1% or so may be sufficient.

Suitable volatile or non-volatile diluent such as pentane or a commercial naphtha, or a light or heavy oil which may later serve as additional softener when incorporated into the rubber may be used. Inasmuch as such polymerizations are usually exothermic, it is generally desirable to provide some means of cooling the reaction chamber either externally or internally. The molecular weight may be readily controlled by the temperature and duration of the polymerization.

As a particular example of a preferred method of preparing such a polymer, isobutylene is polymerized at a temperature of about —10° C. by bubbling boron fluoride gas through a solution of isobutylene dissolved in propane. A polymer of about 4,000 to 6,000 molecular weight may be prepared in this manner and the volatile solvent is removed by distillation, after which any catalyst remaining dissolved or suspended in the liquid is removed by blowing with steam or by washing and kneading with water or dilute caustic soda, leaving the colorless plastic polymer residue. Polymers of lower or higher molecular weight are prepared by varying the purity of the isobutylene and the temperature of polymerization.

Plasticizers prepared according to the above described method have a high viscosity index, i. e., they show a relatively little change in viscosity with temperature. This property is highly desirable when the softener is to be compounded in certain types of rubber goods where it is desirable to have relatively constant properties of pliability and elasticity over a fairly wide range in temperature. Hydrogenated rubber may also be used as a softener, although it is not quite as satisfactory as polyisobutylene. It is of course understood that mixtures of the above described novel softeners may be used, or one or more of them may be used in conjunction with known softeners such as those mentioned previously.

The amount of this new polymerized hydrocarbon softener to be used in making compounded rubber compositions may vary over a wide range such as from 0.1 to 50% or even considerably more in case it is desired more to use rubber as a stabilizing or body-giving agent for the plastic hydrocarbon polymer. However, when used simply as a softener or plasticizer in ordinary rubber compounding, approximately 0.1% to 1% or 5% or possibly 10%, based on the content of rubber plus plasticizer in the mix, is preferred.

In order to have all of the ingredients properly mixed or blended together, several different methods may be used, first of which is mixing on the usual rubber mill or Banbury mixer which comprises essentially a series of steel rolls set fairly close together so that they effect a combined grinding and kneading action on the plastic rubber mass being mixed. Another method of mixing is to dissolve both the synthetic rubber and the polymerized hydrocarbon softener separately in a suitable volatile solvent such as naphtha and then to mix these two solutions, continuing the agitation while evaporating off the solvent. If the mixing is not continued a separation of the materials into two layers may occur. If this product is to be cured the usual curing agents and accelerators as well as other materials such as fillers, anti-oxidants, etc., may be admixed with the rubber and softener before evaporation of the solvent and then the curing effected after the solvent has been removed.

In the manufacture of dipped goods, these plasticizing polymers may be added directly to the dipping solution, or they may be used as a separate dip in solutions of Varsol, naphtha, carbon tetrachloride, benzol, or similar solvents. Alternate dips of this material and synthetic rubber can be made in this manner if so desired. Sulfur chloride may be added to one of the alternate dipping solutions, if desired, to effect curing. Fillers, reinforcers, colored pigments, anti-oxidants and other known addition agents may, of course, be added to the dipping solution or may be incorporated in the synthetic rubber before it is dissolved in the solvent to provide a cement. Finished goods dipped from these cements may be cured or vulcanized by any of the common methods known to the art.

The plastic hydrocarbon polymer may be incorporated any time before vulcanization into batches which are to be subjected to that treatment. In making so-called "hard synthetic rubber," a small amount of plastic polymer may be used to give the finished product greater flexibility and toughness. The polymer may also be incorporated into rubber-like products or derivatives such as the recently developed materials made by treatment of rubber with halogen compounds such as boron fluoride, fluoboric acid, chlorostannic acid, etc. The latter materials may be designated as haloformed rubber.

Use of such plasticizing polymers may also be made in the manufacture of synthetic rubber articles from a synthetic latex. In this case, a suspension or emulsion of the polymer, such as isobutylene polymer, may be made and employed separately, or in conjunction with, or admixed with the "latex" emulsion. In this case the resulting mixture may be used with any of the common methods of synthetic rubber deposition, such as electrolytic deposition, or the use of chemical coagulating agents for the production of finished goods.

In the preparation of rubberized fabrics, the synthetic rubber impregnated cloth may be coated with a layer of these plasticizing polymers, and vice versa, i. e. the fabric may be coated first with these polymers, as by dipping the goods in a solution thereof, and following by a dip with rubber. Another outside layer of plasticizing polymer may also be added on the synthetic rubber coating. Also, these plasticizing polymers and/or synthetic rubber, or mixtures of the two, may be calendered or frictioned on to textile fabrics with any of the methods well known to the art.

Plasticized synthetic rubber compositions prepared according to the present invention not only have the usual properties imparted to such compositions by ordinary softeners but they have the additional advantages that owing to their particularly inert nature they also serve to a certain extent as anti-oxidants and help to prevent sun-cracking of the compounded goods. Such plasticized synthetic rubber compositions may be used for a wide variety of purposes as is well known in the art, but are especially suitable for use in manufacturing soft moulded mechanicals, dipped goods and coated fabrics.

Although not intending the invention to be limited thereby, the following specific examples are given to illustrate commercial applications of the invention:

Example 1

A suitable formula for preparing a carbon black tire tread is as follows:

| | Parts |
|---|---|
| Diolefin polymer | 100.0 |
| Reclaim | 30.0 |
| Reinforcer (carbon black) | 50.0 |
| Filler (ZnO, clay, etc.) | 10.0 |
| Softener (polym. isobutylene of 5,000 molecular weight) | 3.0 |
| Sulfur | 5.0 |
| Anti-oxidant | 1.0 |
| Accelerator | 1.0 |
| Total | 200.0 |

Cure 30 min. at 295° F.

Example 2

The following formula may be used as an adhesive tape dough:

| | Parts |
|---|---|
| Diolefin polymer | 50.0 |
| Rubber reclaim | 50.0 |
| Polymer (10,000 molecular weight) | 30.0 |
| Mineral oil softener | 10.0 |
| Zinc oxide | 25.0 |
| Lithopone | 75.0 |
| Total | 240.0 |

These materials are milled together in the usual manner and either petroleum naphtha or benzol or a mixture of the two added to give the desired consistency. The dough is then spread upon suitable fabric to provide the tape.

Other materials such as rubber, waxes, resins, soaps, organic acids, oxidation inhibitors, pigments, vulcanizing agents, plasticizing agents, fillers, and the like may be added to the compositions herein described.

This application is a continuation-in-part of my earlier application Serial No. 717,575 filed on March 27, 1934.

It is not intended that the invention be limited by any of the specific examples given hereinabove nor by any theories of the operation of the invention but only by the appended claims in which it is intended to claim all inherent novelty in the invention as broadly as the prior art permits.

I claim:

1. A flexible, tough, and moldable composition of high stability comprising a synthetic diolefin hydrocarbon polymer rubber and a linear type plastic aliphatic iso-mono-olefin hydrocarbon polymer having an average molecular weight above 800.

2. A flexible, tough, and moldable composition of high stability comprising a synthetic diolefin hydrocarbon polymer rubber compounded with about 0.1% to 50% of a linear type plastic polymer of isobutylene having an average molecular weight in the range of 800 to about 200,000.

3. A method of plasticizing and stabilizing a synthetic diolefin hydrocarbon polymer rubber which comprises intimately mixing with said rubber a long chain type plastic polymer of an iso-mono-olefin, said polymer having an average molecular weight above 800 and being substantially colorless.

4. A method according to claim 3, in which about 0.5% to 50% of said plastic polymer is thoroughly compounded with said synthetic rubber together with other rubber compounding agents by mechanical mixing.

5. A plasticized and stabilized synthetic diolefin hydrocarbon rubber comprising an emulsion of said synthetic diolefin hydrocarbon rubber and polymerized isobutylene having an average molecular weight above 800.

6. A vulcanizable mixture comprising a major proportion of a synthetic diolefin hydrocarbon polymer rubber, 0.1% to 50% of a plastic polymer of isobutylene having an average molecular weight above 800, and a vulcanizing agent.

7. A vulcanized product comprising a vulcanized mixture of a synthetic diolefin hydrocarbon polymer rubber and a plastic polymer of isobutylene having an average molecular weight above 800.

PETER J. WIEZEVICH.